United States Patent [19]
Bonola

[11] Patent Number: 5,953,516
[45] Date of Patent: *Sep. 14, 1999

[54] METHOD AND APPARATUS FOR EMULATING A PERIPHERAL DEVICE TO ALLOW DEVICE DRIVER DEVELOPMENT BEFORE AVAILABILITY OF THE PERIPHERAL DEVICE

[75] Inventor: Thomas J. Bonola, Houston, Tex.

[73] Assignee: Compaq Computer Corporation, Houston, Tex.

[ * ] Notice: This patent is subject to a terminal disclaimer.

[21] Appl. No.: 08/881,183

[22] Filed: Jun. 24, 1997

Related U.S. Application Data

[63] Continuation of application No. 08/440,638, May 15, 1995, Pat. No. 5,717,903.

[51] Int. Cl.$^6$ .......................... G06F 9/455; G06F 15/177
[52] U.S. Cl. ............................................. 395/500
[58] Field of Search .................. 395/500, 681

[56] References Cited

U.S. PATENT DOCUMENTS

| | | | |
|---|---|---|---|
| 4,855,905 | 8/1989 | Estrada et al. | 395/500 |
| 5,303,378 | 4/1994 | Cohen | 395/650 |
| 5,491,813 | 2/1996 | Bondy et al. | 395/500 |
| 5,548,783 | 8/1996 | Jones et al. | 395/836 |

*Primary Examiner*—Kevin J. Teska
*Assistant Examiner*—Ayni Mohamed
*Attorney, Agent, or Firm*—Akin, Gump, Strauss, Hauer & Feld

[57] ABSTRACT

A method of emulating a peripheral device in a multiprocessor computer system to test device driver programs. The emulation program is loaded by a host microprocessor into one or more of the other microprocessors (target microprocessors) which are not being accessed by the operating system software. After the emulation program is loaded, control vectors to the entry point of the emulation program, where the environment in each of the target microprocessors are initialized for the emulator program. If more than one target microprocessor are utilized, then one of the target microprocessors are designated as the "master" microprocessor, which accepts interprocessor interrupts from the host microprocessor. When the device driver program running on the host microprocessor invokes an I/O command, and emulation mode is selected, then an interprocessor interrupt (IPI) is asserted to the master microprocessor. In response, an I/O emulation interrupt handler is executed by the master microprocessor to provide the appropriate responses to the device driver under test.

9 Claims, 12 Drawing Sheets

METHOD AND APPARATUS FOR EMULATING A PERIPHERAL DEVICE TO ALLOW DEVICE DRIVER DEVELOPMENT BEFORE AVAILABILITY OF THE PERIPHERAL DEVICE

This is a continuation of application Ser. No. 08/440,638 filed May 15, 1995 and now U.S. Pat. No. 5,717,903.

SPECIFICATION

BACKGROUND OF THE INVENTION

1. Field of the Invention

The invention relates to peripheral devices, and more particularly, to a method of emulating peripheral devices to allow for the development of device drivers before availability of the peripheral devices.

2. Description of the Related Art

Historically, computer systems have developed as single microprocessor, sequential machines which process one instruction at a time. However, performance limits are being reached in single microprocessor computer systems. As a result, multiprocessor computer systems comprising multiple microprocessors are developed that work in parallel on different tasks or different parts of a task. The multiple microprocessors are typically connected via a host bus. Also, an expansion bus for connection to peripheral devices is typically connected to the host bus through an interface. Because of the increased performance demands, peripheral devices often include a bus master, which can directly communicate with the memory of the computer system, freeing the system microprocessors up for other activities.

An operating system executes on the various microprocessors, and serves as the interface between the various application programs and the hardware of the computer system. The operating system communicates with the various peripheral devices via I/O control programs referred to as device drivers. A device driver acts as an interface between the operating system and the corresponding peripheral device. The device driver provides control commands to activate the peripheral device and to check the device status to determine when it is ready for a data transfer. The device driver also performs error checking when transfers are occurring to ensure that the transfer has completed successfully. Further, the device driver responds when the peripheral device indicates completion of the control commands.

To write a device driver program, a detailed knowledge of the peripheral device is required. Consequently, device drivers are typically provided by manufacturers of the peripheral device. In many instances, the actual peripheral device hardware may not be available while the device driver is being developed by the manufacturer. As a result, actual testing and any debugging changes that need to be made must wait until the actual hardware becomes available. This increases the development time for the device driver, and as a result, the peripheral device, thereby delaying the availability of the new peripheral device. If a large portion of the device driver testing and debugging could occur without the need for the actual peripheral device hardware, the overall time to develop a peripheral device would be decreased, resulting in more rapid computer system improvement. It is further desirable that this testing be performed under conditions close to those present if the peripheral device were present. It may be possible to develop emulators to simulate peripheral device operation, but the emulator would operate on the same microprocessor as the device driver, thus providing a highly artificial environment which provides little testing of numerous portions of device driver operation, such as multitasking, multithreading, and real time operation.

SUMMARY OF THE PRESENT INVENTION

The method and apparatus according to the present invention performs an emulation of a peripheral device. The emulation is performed by one or more free microprocessors in a multiprocessor computer system. In the preferred embodiment, during the power up initialization phase of the device drivers, the emulation program is loaded by a host microprocessor from the hard disk drive to an allocated region in system memory. After the emulation program is loaded, control vectors to the entry point of the emulation program. Because there are 4 microprocessors in the preferred embodiment, the emulation program can be divided into different tasks and run on up to 3 free target microprocessors, that is, those microprocessors not being accessed by the operating system software. If multiple microprocessors are used, the microprocessor ("master" microprocessor) on which the first instance of the emulation program is running is set up to accept an interprocessor interrupt (IPI) from the host microprocessor. The IPI is a means by which the host microprocessor performs an interprocessor communication with another microprocessor in the preferred embodiment. Once the target microprocessors have been properly initialized, the target CPUs remain idle until an interprocessor interrupt is asserted by the host microprocessor to the master CPU. If emulation mode is selected, then I/O commands issued by the device driver cause the host microprocessor to issue an IPI to the master microprocessor, which responds by invoking an I/O emulation interrupt handler for performing the actual peripheral device emulation. Upon completion of the I/O emulation, the host microprocessor is notified. Thus, by running the emulator program on one or more target CPUs to emulate a peripheral device, the device driver developer can test various features of the device driver such as multi-tasking, multi-threading and real time operations.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
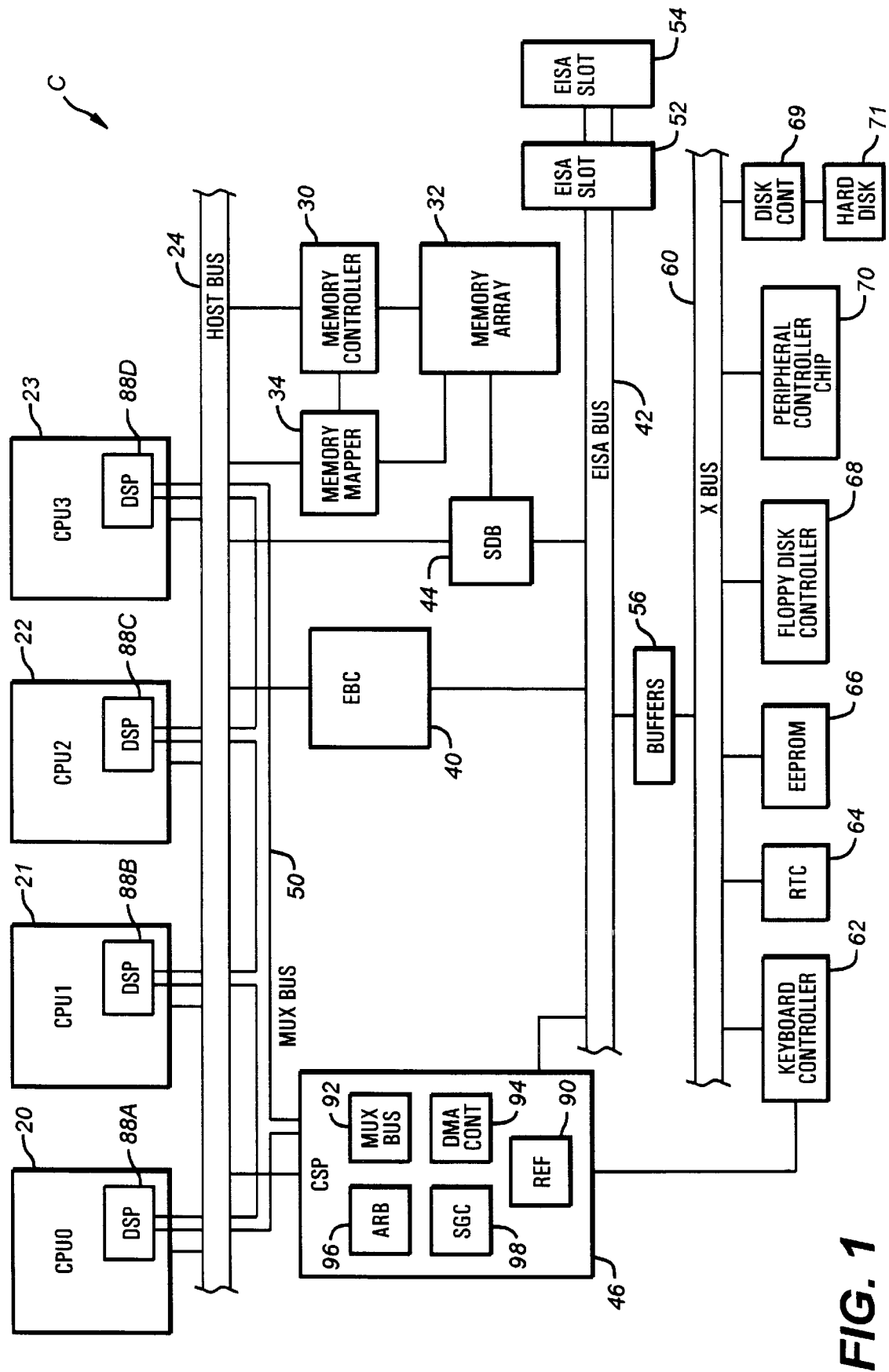
FIG. 1 is a block diagram of an exemplary multiprocessor computer system that incorporates the preferred embodiment of the present invention.

Referring now to FIG. 1, a computer system C is shown which is a multiprocessor system preferably comprising four central processing units (CPUs) in the preferred embodiment, although the present invention may be incorporated into a system having only two CPUs. The CPUs are general purpose processors such as the 80486 and Pentium processors from Intel Corporation or other processors from other manufacturers. The elements of the computer system C that are not significant to the present invention other than to illustrate an example of a fully configured computer system are not discussed in detail. Most of the functions and device blocks shown in FIG. 1 are preferably mounted on a system board (not shown). The computer system C preferably includes four CPUs referred to as CPUs 20, 21, 22 and 23, which are connected to a host bus 24. The CPUs 20–23 are referred to as CPU0, CPU1, CPU2 and CPU3, respectively, indicating the preferred logical port assignments. In the preferred embodiment, at least four CPU connectors are provided on the host bus 24 for receiving interchangeable CPU cards 20–23, where the CPUs 20–23 are essentially identical in configuration and function. In the preferred embodiment, the computer system C is capable of supporting up to a maximum of 8 CPUs. The port assignments are initially determined by the physical slot that a CPU card is plugged into, although logical port assignment is preferably programmable.

A memory controller 30 is coupled to the host bus 24 and also to a main memory array 32, preferably comprising several banks of DRAMs. Memory mapper logic 34 is coupled to the host bus 24, the memory controller 30 and the memory array 32, and provides memory mapping functions to facilitate memory accesses to the memory array 32. The computer system C includes an expansion bus 42 which is preferably the Extended Industry Standard Architecture (EISA) bus, although other types of expansion buses are contemplated. Other architectures include those having both an EISA expansion bus and a PCI mezzanine bus. In the PCI-EISA systems, APIC or open-PIC subsystem are used. A corresponding EISA bus controller (EBC) 40 is coupled between the host bus 24 and the EISA bus 42. The EBC 40 provides various bus cycle translation and conversion functions to facilitate transfers between the host bus 24 and the EISA bus 42. A system data buffer (SDB) 44 is coupled to the host bus 24, the EISA bus 42 and the memory array 32. The SDB 44 functions to buffer and transfer data between the host bus 24 and the memory array 32, between the host bus 24 and the EISA bus 42, and between the EISA bus 42 and the memory array 32.

A logic block referred to as a central system peripheral (CSP) 46 is coupled to the host bus 24, the EISA bus 42 and is also coupled to a keyboard controller 62. The CSP 46 is preferably coupled through a MUX bus 50 to a logic block referred to as the distributed system peripheral (DSP) 88A in the CPU 20, to a DSP 88B located in the CPU 21, to a DSP 88C located in the CPU 22, and to a DSP 88D in the CPU 23. The MUX bus 50 comprises a plurality of lines for transferring signals between the CSP 46 and the DSPs 88A–D.

The EISA bus 42 includes a plurality of EISA slots 52 and 54 for receiving EISA interchangeable expansion cards such as, for example, network interface or hard disk interface cards. The EISA bus 42 is coupled through buffers 56 to a bus referred to as an X bus 60. A number of peripheral devices are coupled to the X bus 60, including the keyboard controller 62, a real time clock (RTC) 64, an electrically erasable programmable read only memory (EEPROM) 66, a floppy disk controller 68 and a peripheral controller chip 70, which includes numerous ports and UARTs (universally asynchronous receiver/transmitters). The EEPROM 66 contains certain basic operating routines, referred to as the BIOS, to perform power up functions in the computer system C. The power up functions include the initialization of device drivers for the peripheral and I/O devices. The X bus 60 is also coupled to a hard disk controller 69, which provides control and data signals to a hard disk drive 71.

The CSP 46 includes various system functions, including a refresh controller 90, a MUX bus interface 92 coupled to the MUX bus 50, a direct memory access (DMA) controller 94, an EISA or central arbitration controller (CAC) 96 and other miscellaneous system board logic functions which are generally referred to as the SGC 98. The refresh controller 90 controls the refresh of the DRAMs in the memory array 32, and the DMA controller 94 controls direct memory accesses to the memory 32 by the peripheral and I/O devices. The MUX bus interface 92 receives various interrupt request signals IRQ3–IRQ12, IRQ14 and IRQ15 from the various peripheral and I/O devices. The MUX bus interface 92 then transmits corresponding interrupt request signals to the DSPs 88A–D via the MUX bus 50. The SGC 98 in the CSP 46 includes the CPU restart logic and force A20 logic and asserts corresponding RSTAR and LOW A20 signals, which are provided to the MUX bus 50.

Other miscellaneous transfers are required to inform the DSPs 88A–D of the occurrence of several miscellaneous events within the CSP 46. Both the assertion and deassertion of these events are transferred on the MUX bus 50. Upon power up, the computer C automatically determines which CPUs are installed in available physical CPU slots and assigns logical port numbers. A power up timeout signal is asserted if a CPU does not respond before timeout of a timer indicating that the CPU is not installed.

Figure 2:
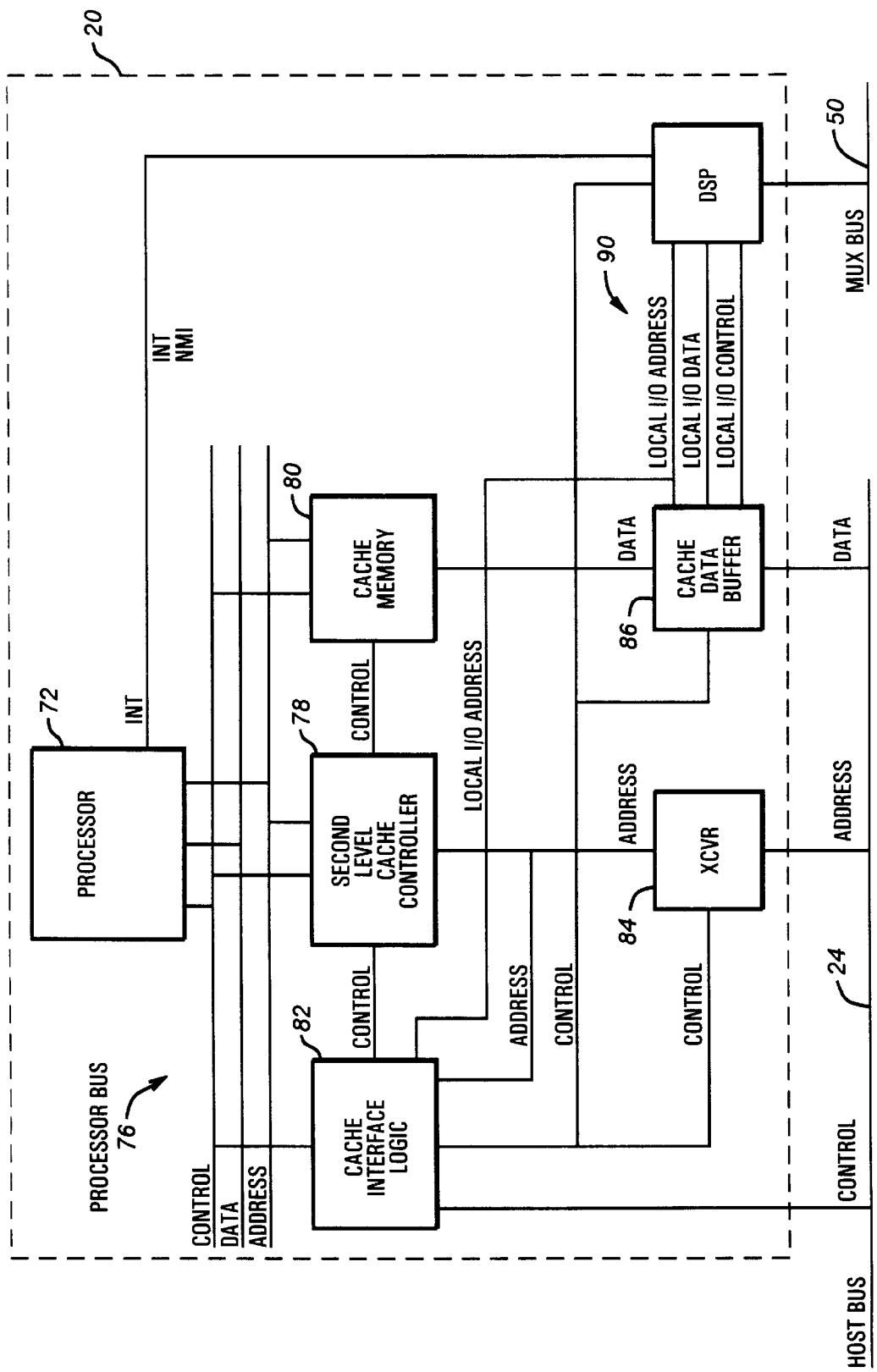
FIG. 2 is a block diagram of a central processing unit in the multiprocessor computer system of FIG. 1.

Referring now to FIG. 2, a block diagram of the CPU 20 is shown. The CPUs 20–23 preferably operate in a very similar manner, except that only the CPU 20 generates a memory refresh in the preferred embodiment since it is preferably the host CPU, that is, it is assigned to logical CPU0. The CPU 20 is now described, it being understood that the following description applies also to CPUs 21–23. The CPU 20 includes a microprocessor 72 which is preferably either the Pentium or the 80486 microprocessor from Intel. The microprocessor 72 is coupled to a processor bus 76, which includes control, data and address portions as shown. A second level cache controller 78 is coupled to the address and control portions of the processor bus 76. A cache memory 80 is coupled to the address and data portions of the processor bus 76. The cache controller 78 connects to the cache memory 80 via various control lines to provide a unified writeback and instruction cache which is transparent to system software.

Cache interface logic 82 is coupled to the cache controller 78 through control lines and is coupled to the control portion of the processor bus 76 and the host bus 24. The address pins of the cache controller 78 are connected to a transceiver 84, which in turn is connected to the host bus 24. The address signals provided by the transceiver 84 are also connected to the cache interface logic 82. The data pins of the cache memory 80 are connected to a cache data buffer 86, which is connected to the host bus 24. The cache data buffer 86 is connected to the DSP 88A via a local I/O bus 90 comprising local I/O address data and control lines.

The DSP 88A includes a programmable interrupt controller (PIC), NMI logic, various timers and a multiprocessor interrupt (MPINT) logic. The PIC preferably comprises two cascaded 8-bit interrupt controllers INT-1 and INT-2, each similar to the Intel 8259 to provide 15 levels of interrupts. Control, mask, and edge/level control registers are provided in the DSP 88A for each of the interrupt controllers INT-1 and INT-2. The INT-1 has inputs IRQ0–IRQ7, where IRQ2 is the cascaded interrupt IRQ2 from INT-2. INT-2 receives inputs IRQ8–IRQ15. The CSP 46 provides the interrupts IRQ1, IRQ3–12 and IRQ14 and IRQ15, as described previously, across the MUX bus 50 to the PIC.

Certain of the IRQ inputs to the PIC are asserted by peripheral devices such as keyboards, hard disk drives, floppy disk drives, display monitors and other components. Each peripheral device notifies the microprocessor that it requires servicing by asserting an IRQ signal to the PIC, which functions as an overall manager in accepting interrupt requests from the peripheral devices. The IRQ0 signal is provided by the various timers and provides a system timer interrupt for a time of day, diskette timeout and other system timing functions. The IRQ13 interrupt is shared with a DMA interrupt, a correctable memory error interrupt, a coprocessor error interrupt and several CPU IRQ13 programmable interrupts. The PIC determines which of the incoming requests has the highest priority and whether any of the IRQ lines are masked. The PIC then issues an interrupt INT to the microprocessor 72 based on this determination. In response to the assertion of the signal INT, the microprocessor 72 finishes completion of the current instruction. Next, the microprocessor 72 saves the state of the interrupted program which includes its address and the contents of certain registers onto a stack to allow resumption of the interrupted program once the interrupt has been serviced.

The microprocessor 72 then asserts an interrupt acknowledge cycle on the local I/O bus 90, which causes the appropriate one of the 8259 interrupt controllers to provide an 8-bit interrupt vector onto the local bus 90. The microprocessor 72 then determines the branch address of the interrupt service routine based on the interrupt vector. The interrupt service routine is then executed to perform the functions requested by the peripheral device. After completion of the interrupt service routine, an end-of-interrupt (EOI) cycle is executed to the PIC.

The NMI logic in the DSP 88A generates an NMI interrupt via a signal NMI to notify the local microprocessor 72 of conditions in the system that need immediate attention before the microprocessor 72 may proceed with its current task.

The MPINT logic allows CPU interprocessor interrupts (IPIs) and other interrupt sources to be shared at any interrupt level, thus allowing for greater software flexibility in a multiprocessor environment. The MPINT logic generates interrupt levels MPIRQ0–15, which are generated in response to interprocessor interrupts. Each programmable CPU interrupt may be individually enabled, disabled, set or cleared in any interrupt level through multiprocessor interrupt control/status ports. The MP interrupt ports are generally referred to as control ports when written to and status ports when read. Each level of interrupt, generally represented by the letter X, is an integer from 0 through 15 excluding level 2, where each of the interrupt levels MPIRQ0–15 has its own MP interrupt control/status port. Predetermined values written to the control ports can thus enable or set an interrupt level MPIRQX to respond to an IPI. The status for each of the interrupt levels X can be obtained by reading the corresponding MP interrupt status port. The microprocessor 72 may access its own MP interrupt ports via a local bus access and may access the MP interrupt ports of other processors through the host bus 24.

Interprocessor interrupts are mapped to interrupt level MPIRQX via a CPU interrupt mask port and a CPU programmable interrupt port. The MP interrupt request outputs (MPIRQX) are ORed with the IRQX inputs within the PIC, thus allowing for the sharing of interprocessor interrupt levels with normal system interrupts.

In the ensuing description, it is assumed that the CPU 20 is the host CPU, although any of the other CPUs 21–23 can be the host. Thus, if the other three CPUs 21–23 are not being used by the operating system, a virtual device emulator (VDE) can be executed on one or more of the CPUs 21–23. The VDE can be subdivided into multiple tasks and run on multiple target CPUs. When more than one CPU is used to execute the VDE, the CPU 21 is preferably referred to as the master CPU.

The virtual device emulator is separated into two portions. The first portion is the emulator loader (EMLOADER.SYS) and is run on the host CPU 20. The second portion is the emulator (EMULATOR.EXE). The loader EMLOADER.SYS, which is operating system dependent, loads the emulator EMULATOR.EXE into system memory 32 for execution by one or more of the target CPUs 21–23. The emulator EMULATOR.EXE is operating system independent and is thus executed on the target CPUs free of operating system control.

The peripheral device developer can enable or disable emulation of peripheral and I/O devices by setting a parameter EIO_EMULATOR high or low, respectively. In the preferred embodiment, the device drivers are written as C code. To perform I/O commands to peripheral devices, the device drivers execute various macro commands. Two sets of macro commands are available, wherein the compiler or assembler compiles one set based upon the state of the parameter EIO_EMULATOR. One set of macro commands perform the actual I/O command to an existing peripheral device, whereas the other set of macro commands issues an interprocessor communication sequence to pass the I/O command to the master CPU 21 for performing emulation of peripheral devices. The first set of macro commands is utilized when the parameter EIO_EMULATOR is set low at compile time, which indicates that emulation mode is not selected, and the second set of macro commands is utilized if the parameter EIO_EMULATOR is set high at compile time, indicating that emulation mode is selected. In emulation mode, the I/O commands, addresses and data are passed via an IPI packet located preferably in the memory 32. In addition, in the preferred embodiment, a parameter EIO-COMPLETE is included in the IPI packet to allow the target CPUs 21–23 to notify the host CPU 20 that an I/O emulation has completed. In an alternative embodiment, one or more of the target CPUs 21–23 can assert interprocessor communication sequences via IPIs back to the host CPU 20 to notify the host CPU 20 that emulation has completed.

Figure 3A:
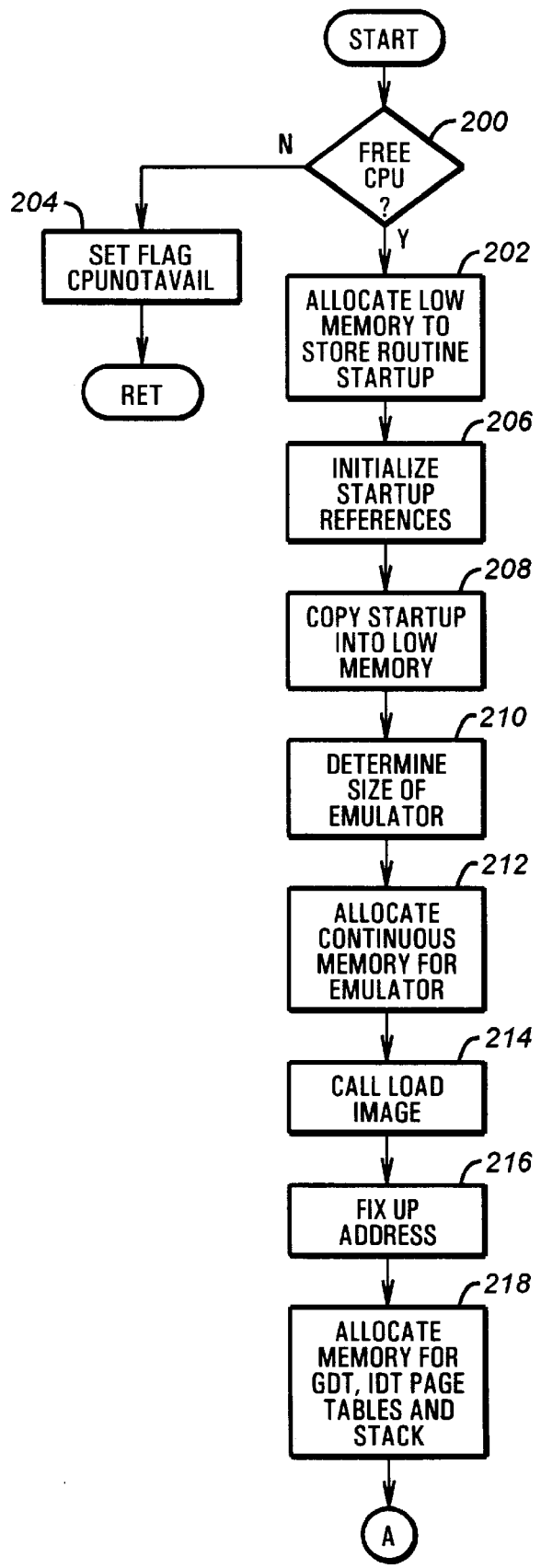
FIGS. 3A and 3B are a flow diagram of a routine for loading an emulator program from a hard disk drive into a memory in the multiprocessor computer system of FIG. 1.
Figure 3B:
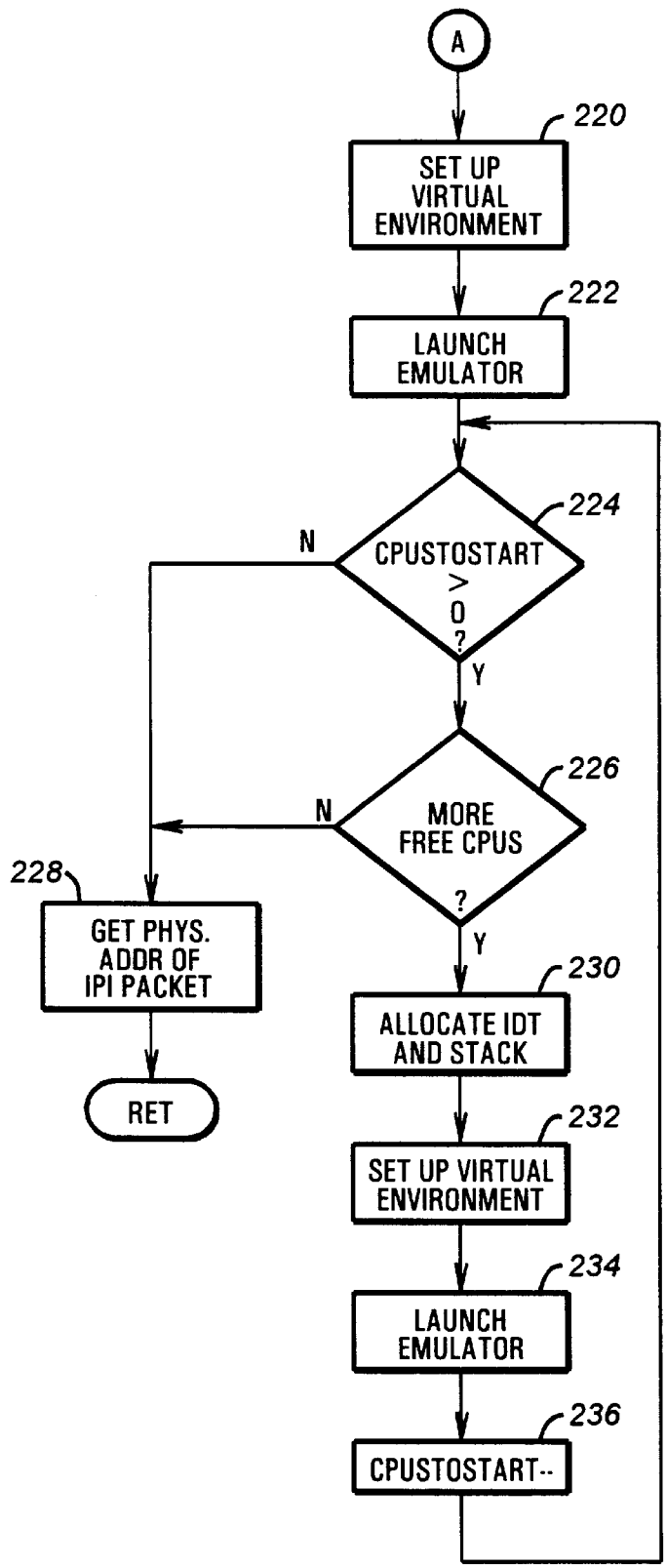

Referring now to FIGS. 3A and 3B, the flow diagram of the program that loads the emulator EMULATOR.EXE into system memory 32 is shown. The program is merely one embodiment of loading the emulator file from the hard disk drive 71 into the memory 32, it being contemplated that other loading methods exist. During the computer system power up process, one of the functions performed by the booting procedure is to initialize the device drivers. The loader EMLOADER.SYS is invoked during the initialization of the device drivers. Beginning in step 200, it is determined if a free CPU is available. This is accomplished by searching the CPU chain for a CPU that is not being used by the operating system, that is, the CPU is in sleep mode. If a free CPU is found, then control proceeds to step 202. Otherwise, control proceeds to step 204, where a flag CPUNOTAVAIL is set high to indicate to the host CPU 20 that all of the available CPUs are being accessed by the operating system. From step 204, control returns to the power up BIOS routine.

In step 202, a portion of low memory is allocated to store a Real Mode routine STARTUP. Because the routine STARTUP is executed in Real Mode, it is loaded into the lower 1 Mbyte of the memory 32. The routine STARTUP is used to perform BIOS INT 13H physical disk services to load the emulator EMULATOR.EXE from the hard disk drive 71 into the memory 32. In the preferred embodiment, INT 13H calls must be executed to perform any physical disk services to the hard disk drive 71. The software interrupt INT 13H causes a BIOS disk service routine to be invoked to provide the appropriate commands to the hard disk drive controller 69. Because different types of hard disk drives require different command and data sequences, the BIOS disk service routine necessarily acts as an interface between the OS and the hard disk drive controller 69. If the INT 13H call is issued in the loader EMLOADER.SYS, the host CPU 20 would have to be transitioned from Protected Mode to Real Mode. Such a transition involves high overhead and is thus undesirable. Since it has already been determined that one of the CPUs 21–23 is not currently in use, and thus is in Real Mode, the routine STARTUP can be executed on the free CPU. In this manner, the host CPU 20 need not be transitioned from Protected Mode to Real Mode.

Certain of the registers associated with Protected Mode operation of the 80486 and Pentium microprocessors are described briefly for a better understanding of the following description. The registers include the system flags register EFLAGS, whose bits control I/O, maskable interrupts, debugging, task switching, and the virtual-8086 mode. Among these flag bits is the Interrupt-Enable Flag IF, which when set enables the microprocessor to respond to maskable interrupt requests. Clearing the IF flag disables the interrupts.

Another set of registers is referred to as the memory management registers, which include the Global Descriptor Table Register GDTR and the Interrupt Descriptor Table Register IDTR. The register GDTR contains the 32-bit base address and the 16-bit segment limit for the global descriptor table (GDT). When a reference is made to data in memory, a segment selector is used to find a segment descriptor in the GDT. The segment descriptor contains the base address for a segment. The register IDTR contains the 32-bit base address and 16-bit segment limit for the interrupt descriptor table (IDT). When an interrupt occurs, the interrupt vector is used as an index to obtain a gate descriptor from the IDT. The gate descriptor holds a pointer used to start up the interrupt handler.

The 80486 and Pentium microprocessors also include control registers CR0, CR1, CR2, CR3 and CR4. The control register CR0 contains system control flags to control modes or to indicate states which apply generally to the microprocessor rather than to the execution of an individual task, which is controlled by the flags register EFLAGS. The control register CR3, referred to as the page directory base register, contains the 20 most significant bits of the address of the page directory. Since the page directory must be aligned to a page boundary (each page contains 4K bytes), the lower 12 bits of the register CR3 are not used as address bits.

The 80486 and Pentium microprocessors include segment registers that contain 16-bit selectors. The selectors point to tables in memory, where the tables hold the base address for each segment. The segment containing the instructions being executed is the code segment, whose selector is contained in the CS register. An instruction pointer register EIP contains the offset into the segment pointed to by the CS selector.

A stack is an allocated region in memory that contains the return address, parameters passed by the calling routine, and temporary variables allocated by the procedure. Many stacks can be allocated in memory. The stack segment register SS is used to point to the current stack. The stack pointer register holds an offset to the top-of-stack in the current stack segment.

From step 202, control proceeds to step 206, where parameters to be loaded into the code segment and instruction pointer registers associated with the real mode routine STARTUP and the emulator EMULATOR.EXE are initialized. The Real Mode routine STARTUP contains two entry points STARTUPBIOS and STARTUPEM. If emulation of peripheral devices is desired, that is, the parameter EIO__EMULATOR is defined high, then the compiler or assembler utilizes a first set of hard disk macro commands, which vector to the entry point STARTUPBIOS of the routine STARTUP to perform the INT 13H physical disk services. Otherwise, a second set of hard disk macro commands are utilized by the compiler or assembler which directly perform the INT 13H physical disk services. Once the emulator EMULATOR.EXE is loaded into the memory 32, control vectors to the entry point STARTUPEM, which causes the target CPU to transition from Real Mode to Protected Mode and causes the target CPU to vector to the entry point of the emulator EMULATOR.EXE.

Next, in step 208, the Real Mode routine STARTUP is copied into the allocated lower 1 Mbyte of the memory 32. Next in step 210, the image size of the emulator EMULATOR.EXE is determined. In the preferred embodiment, this is accomplished by reading the first two sectors of the image header of the emulator file located on the hard disk drive 71. The number of pages required to store the emulator image is then retrieved from information stored in these two sectors. Next, in step 212, a physically contiguous portion of the memory 32 is allocated for the emulator file. The starting address of the allocated region of memory for the emulator EMULATOR.EXE is stored in IMAGEB. Proceeding next to step 214, the subroutine LOADIMAGE is called to load the emulator file from the hard disk drive 71 into the allocated chunk of memory. The arguments passed to the subroutine LOADIMAGE are the name of the emulator EMULATOR.EXE and the address IMAGEB.

Figure 4A:
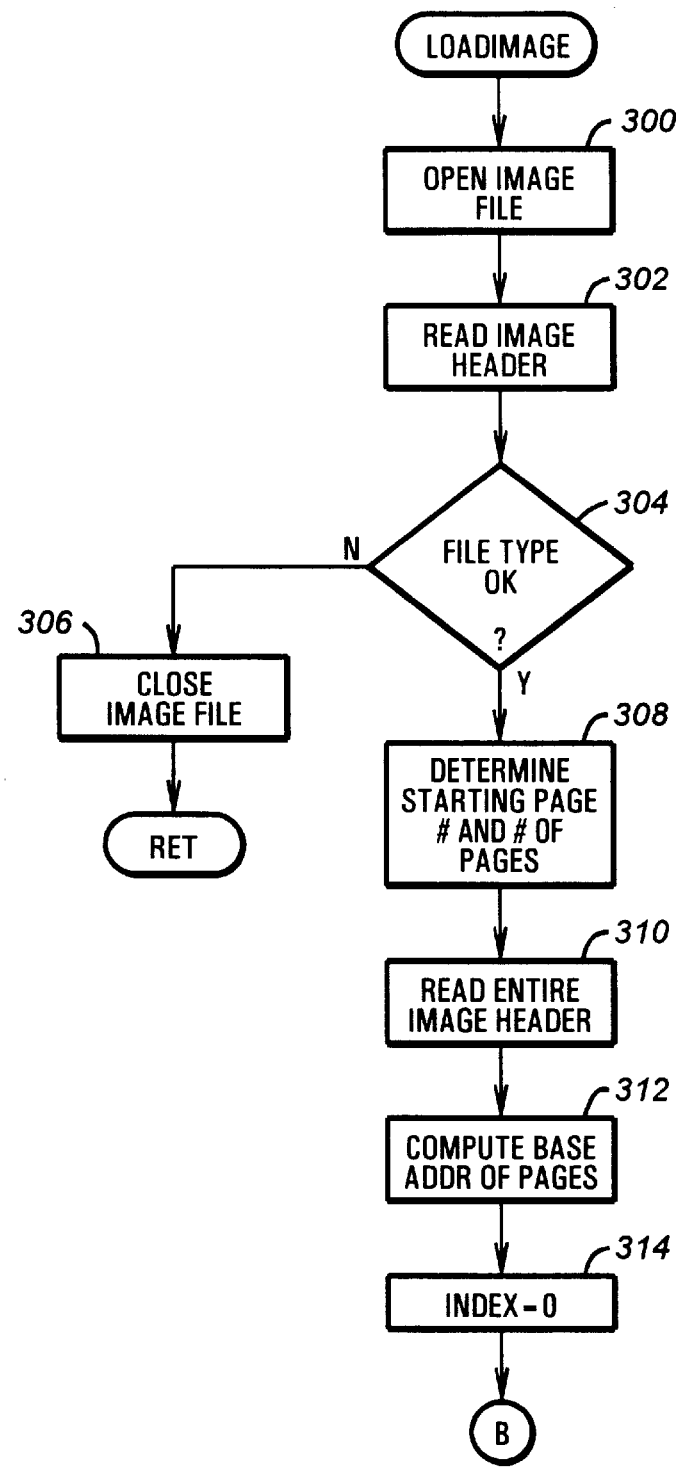
FIGS. 4A and 4B are a flow diagram of a subroutine called by the routine of FIGS. 3A and 3B to perform the actual loading.
Figure 4B:
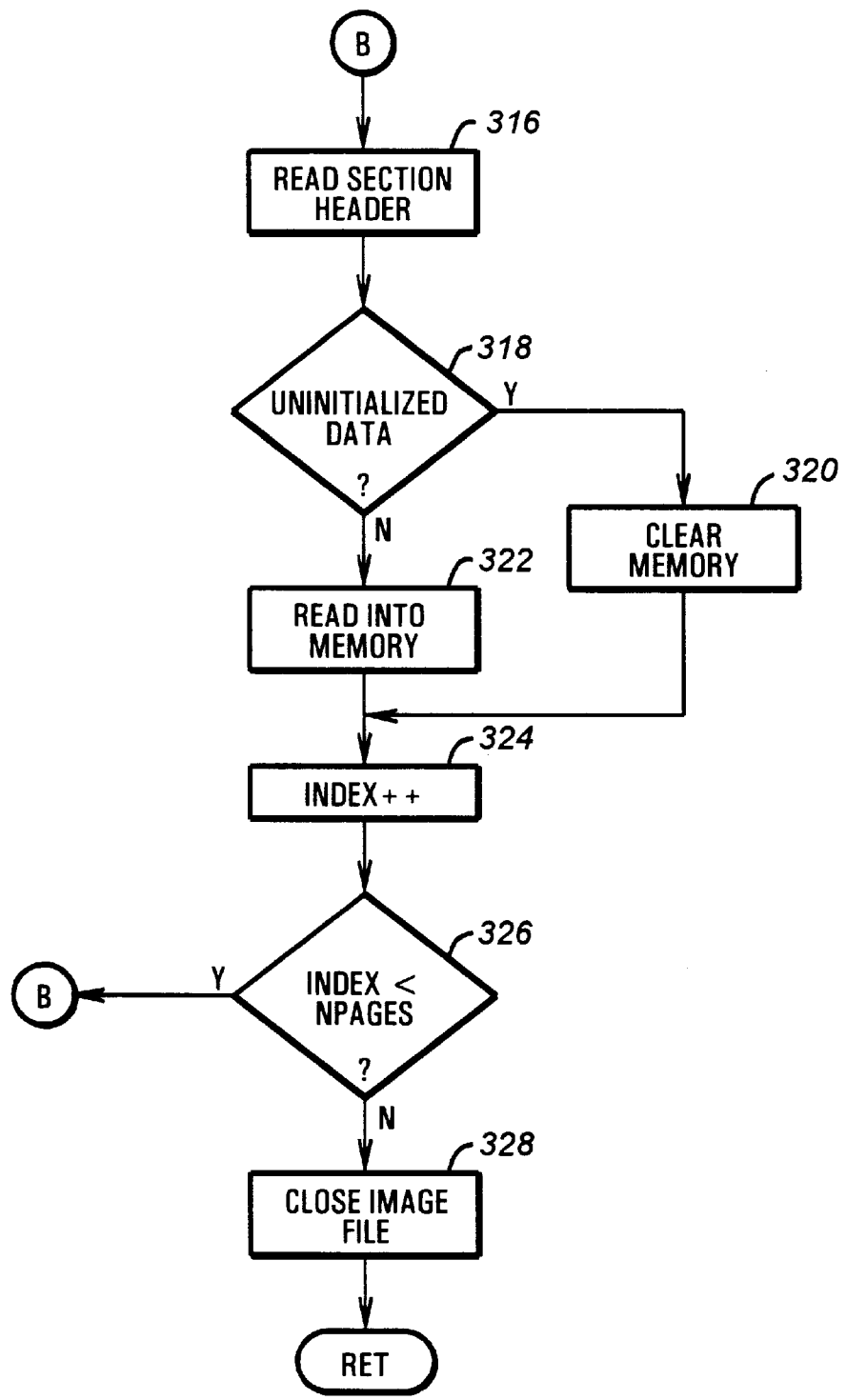

Referring now to FIGS. 4A and 4B, the flow diagram for the subroutine LOADIMAGE is shown. Starting in step 300, the emulator file stored on the hard disk drive 71 is opened. In the preferred embodiment, INT 13H calls must be executed to perform an access to the hard disk drive 71. However, as noted above, the program EMLOADER.SYS runs in Protected Mode on the host CPU 20 and thus is unable to issue the real mode INT 13H call. Therefore, the INT 13H call must be performed by the Real Mode routine STARTUP, which is executed on the target CPU. To invoke the routine STARTUP, the CS:IP pointing to the entry point STARTUPBIOS is loaded into a warm reset vector, which is preferably stored at physical address 0×467. A reset command, represented by the signal RSTAR being asserted, provided to the target CPU would cause control to vector to the location specified by the warm reset vector. In the preferred embodiment, if the emulation mode is selected by defining the parameter EIO__EMULATOR high, then a disk services command issued to the hard disk drive 71 causes the signal RSTAR to be issued to the target CPU.

Proceeding next to step 302, the first two sectors of the image header of the emulator file is read. Next, in step 304, it is determined from information in the two sectors if the emulator file is executable on an 80486 or Pentium microprocessor or is a WINDOWS NT image. If any of the above conditions are true, control proceeds to step 308; otherwise, control proceeds to step 306, where the emulator file on the hard disk drive 71 is closed. From step 306, control returns to step 214 in FIG. 3A.

In step 308, the starting page number and the number of pages NPAGE required to store the entire emulator image is retrieved from the header information in the first two sectors. Proceeding next to step 310, the entire image header of the emulator file is read into the allocated region starting at address IMAGEB of the memory 32.

Proceeding next to step 312, the base address PAGEADR [INDEX] for the emulator image on the hard disk drive 71 is calculated. The address PAGEADR[INDEX] is the starting address of page INDEX. Proceeding next to step 314, the variable INDEX is initialized to the value 0. Next, in step 316, the header of the first page or section is read from the hard disk drive 71. The section header is accessed to determine if the particular page or section contains code or initialized data. In step 318, if it is determined that the particular section contains uninitialized data, control proceeds to step 320, where the memory region starting at address IMAGEB + PAGEADR[INDEX] corresponding to the accessed section of the hard disk drive 71 is cleared. From step 320, control proceeds to step 324.

If it is determined in step 318 that the page or section starting at address PAGEADR[INDEX] in the hard disk drive 71 contains code or initialized data, control proceeds to step 322, where the entire section is read from the hard disk drive 71 into the memory 32 at address IMAGEB + PAGEADR[INDEX]. From step 322, control proceeds to step 324, where the variable INDEX is incremented by 1 to access the next page or section of the hard disk drive 71. Proceeding to step 326, it is determined if the variable INDEX is less than the total number of pages NPAGES. If less, that indicates that more pages are available and control proceeds back to step 316 to begin reading the next page. If in step 326, it is determined that the variable INDEX is equal to or greater than NPAGES, then control proceeds to step 328. In step 328, the emulator file on the hard disk drive 71 is closed. Control then returns to step 214 in FIG. 3A.

Returning now to FIG. 3A, control proceeds from step 214 to step 216, where the address of the loaded emulator EMULATOR.EXE is "fixed up" relative to the physical address IMAGEB of the emulator image that the target CPU will be referencing. The address must be fixed up because the host CPU 20 and the target CPUs 21–23 preferably use different addressing schemes. The host CPU 20 enables the paging mechanism to convert a linear address into the physical address, whereas in target CPUs 21–23, the linear address is used directly as the physical address. Thus, the address of the emulator image must be relocated for proper execution by the target CPUs 21–23.

From step 216, control proceeds to step 218, where physically contiguous portions of the memory 32 are allocated for the global descriptor table GDT, interrupt descriptor table IDT, page tables and stack for the target CPU. Proceeding next to step 220, Protected Mode virtual environment frame parameters for the target CPU are set up. The frame parameters are used later by the Real Mode routine STARTUP to transition the target CPU from Real Mode to Protected Mode. The frame parameters are loaded into the virtual environment segment registers, instruction pointer register EIP, flags register EFLAGS, control and status register CR0, page directory base register CR3, stack pointer register ESP, global descriptor table register GDTR, and interrupt descriptor table IDTR. In addition, the Real Mode CS selector is placed into the GDT so that the Real Mode routine STARTUP can continue executing its next set of instructions after placing the target CPU into Protected Mode.

Figure 5:
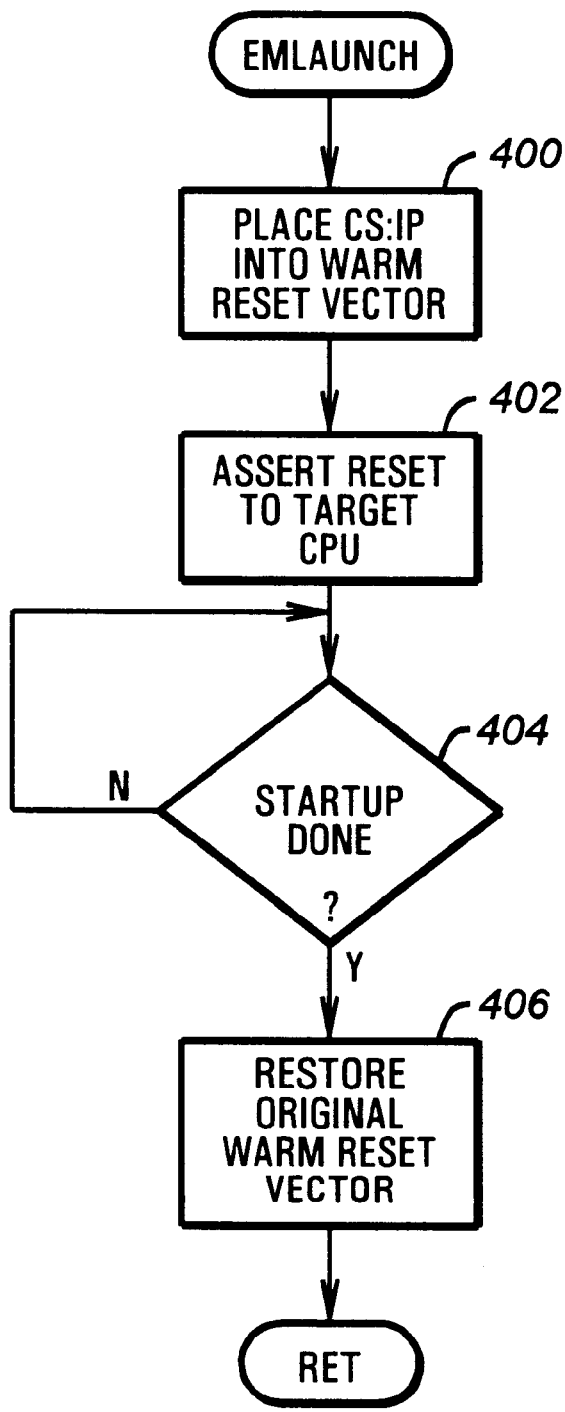
FIG. 5 is a flow diagram of a subroutine for starting the emulator program on a target microprocessor.

Proceeding next to step 222, a subroutine EMLAUNCH is invoked to start the emulator EMULATOR.EXE on the target CPU. Referring now to FIG. 5, the flow diagram of the subroutine EMLAUNCH is shown. Before the emulator program can be run on the target CPU, the CPU must be placed into Protected Mode. Proceeding now to step 400, the CS:IP pointing to the entry point STARTUPEM of the Real Mode routine STARTUP is placed into the warm reset vector. Next, in step 402, the reset signal RSTAR is asserted to the target CPU. This causes the target CPU to retrieve the contents of the warm reset vector and to vector to the CS:IP contained in the warm reset vector. As a result, the routine STARTUP is invoked. After invoking the routine STARTUP, control proceeds to step 404, where the subroutine EMLAUNCH remains until a parameter FRAMERUN is loaded with the value 1.

The parameter FRAMERUN is part of an interprocessor interrupt (IPI) packet, which is a data structure allocated to a region in the memory 32 starting at an address EIOIPI. The physical address EIOIPI is stored in reserved DMA page registers, which are not used by the DMA controller 94 in the preferred embodiment. The IPI packet includes various parameters which are accessed by the target CPUs and the host CPU for certain information. Included in the IPI packet is a parameter EIOCPU which specifies the target CPU ("master" CPU) to receive the IPI; a parameter IPIPORT which specifies the I/O address for the IPI port in the master CPU; a parameter IPILEVEL vectoring to a location in the IDT that corresponds to an I/O emulation interrupt handler EMIOIPI; a parameter IPIVECTOR forming the most significant eight bits of a parameter IPIMASK to indicate the interrupt level to be asserted by the IPI; the parameter IPIMASK containing the parameter IPIVECTOR and containing an 8-bit mask value selecting the logical processors that respond to a write to the interrupt port; parameters EIOCOMMAND, EIOADDRESS, and EIODATA to communicate the requested I/O command, I/O address, and I/O data between the device driver and the emulator EMULATOR.EXE; a parameter EIOCOMPLETE to indicate when the emulation operation has completed; a parameter EIOSEMAPHORE used to lock out further accesses to the emulator when the emulator is currently servicing another request; and a parameter CPUINSTANCE that indicates the instance of the emulator running on the current CPU.

The routine STARTUP causes the target CPU to transition to Protected Mode by loading the Protected Mode virtual environment registers with the frame parameters that were set up in step 220 of FIG. 3B. After the target CPU has transitioned from Real Mode to Protected Mode, the routine STARTUP stores the physical address of the parameter FRAMERUN in the register EAX, which is a general purpose register for holding operands for logical and airthmetic operations. This is done so that the subroutine EMLAUNCH would be notified when the emulator EMULATOR.EXE asserts the parameter FRAMERUN. Next, the CS:IP pointing to the code segment holding the emulator EMULATOR.EXE is vectored to. This starts the emulator program. As will be described below, the emulator EMULATOR.EXE asserts the parameter FRAMERUN once the emulator EMULATOR.EXE is initialized and the I/O emulation interrupt routine EMIOIPI is connected. Thus, once the target CPU has transitioned to Protected Mode and the emulator EMULATOR.EXE has been initialized, the subroutine EMLAUNCH transitions from step 404 to step 406, where the original contents of the warm reset vector are restored. From step 406, control returns to step 222 in FIG. 3B.

Returning now to FIG. 3B, control proceeds to step 224, where it is determined if a variable CPUSTOSTART is greater than 0. The variable CPUSTOSTART is set by the user to indicate the number of target CPUs that the emulator EMULATOR.EXE is to run on. Thus, in the preferred embodiment, the variable CPUSTOSTART can range in value from 1 to 3. If the value of CPUTOSTART is greater than 0, then control proceeds to step 226, where it is determined if more free CPUs are available. If not, control proceeds to step 228. If a free CPU is identified, then control proceeds to step 230, where the interrupt descriptor table IDT and the stack corresponding to the free CPU are allocated in the memory 32. From step 230, control proceeds to step 232, where the Protected Mode virtual environment of the CPU is set up in a manner preferably similar to that described for the master CPU. Next, in step 234, the subroutine EMLAUNCH is invoked to start the free CPU. Control then proceeds to step 236, where the variable CPUTOSTART is decremented by 1. From step 236, control returns to step 224, where it is determined if CPUTOSTART is greater than 0. If not, control proceeds to step 228. If the variable CPUTOSTART is still greater than 0, control proceeds to step 226 to determine if more free CPUs are available. After all the requested CPUs have been started or no more free CPUs are available, control proceeds to step 228, where the reserved DMA page registers are accessed to obtain the physical address EIOIPI of the IPI packet for the emulator. From step 228, control returns to the main BIOS program.

Figure 6:
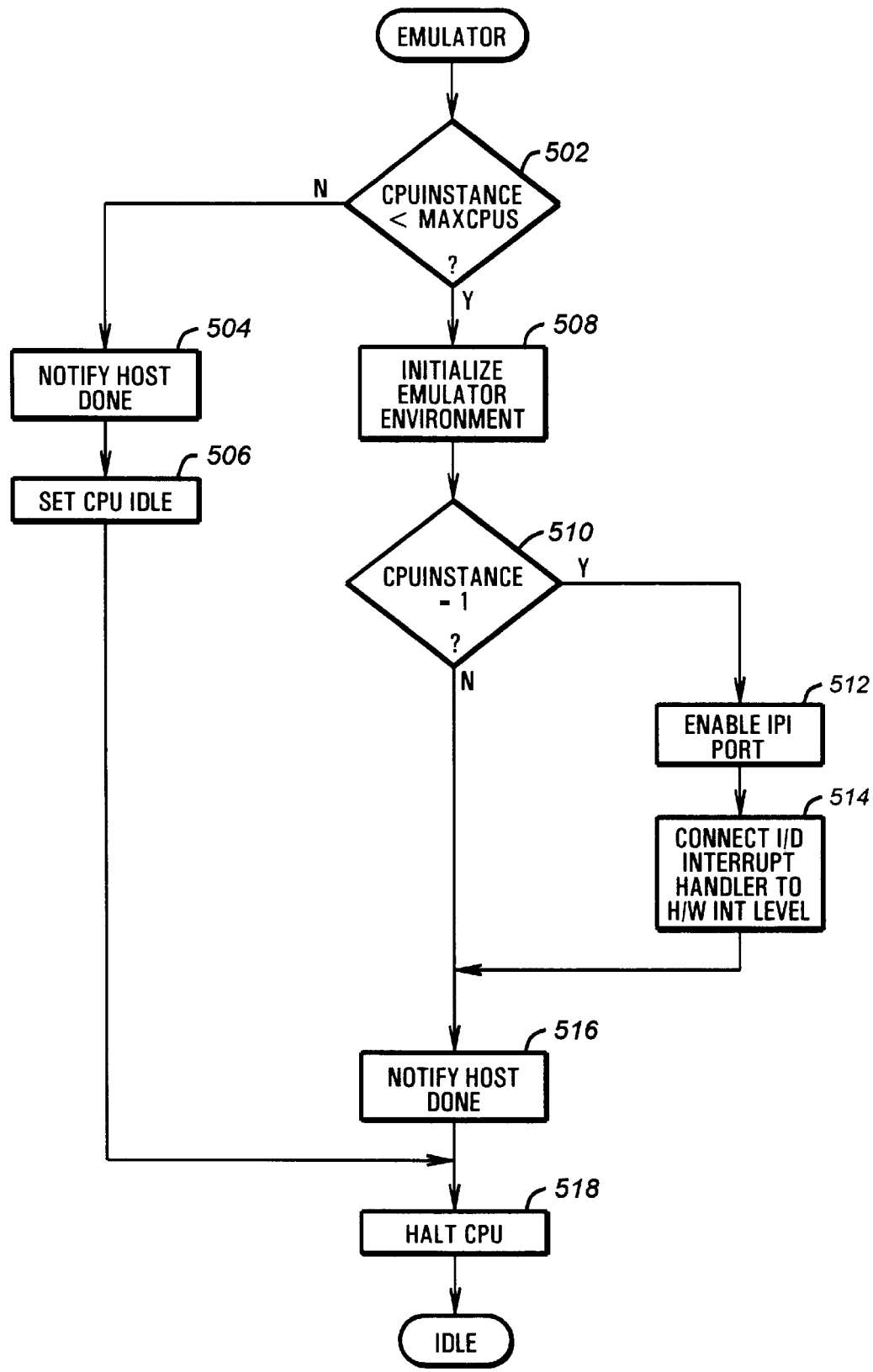
FIG. 6 is a flow diagram of the portion of the emulator program that performs initialization functions.

Referring now to FIG. 6, the flow diagram of the emulator EMULATOR.EXE is shown. As noted above, the entry point to the emulator EMULATOR.EXE is vectored to by the Real Mode routine STARTUP. In step 502, it is determined if the variable CPUINSTANCE is less than the parameter MAXCPUS. In the preferred embodiment, the parameter MAXCPUS is set to 3 to indicate that a maximum of 3 CPUs are available for the emulator program. The parameter CPUINSTANCE, which is part of the IPI packet, indicates the instance of the emulator EMULATOR.EXE running on the particular CPU. Thus, if three CPUs have been assigned to run the emulator EMULATOR.EXE, and logical CPU1 is designated as the master CPU, then logical CPU1 would run the first instance of the emulator. When the emulator EMULATOR.EXE is initialized on logical CPU1, the parameter CPUINSTANCE is incremented to indicate that the next CPU is running the second instance of the emulator. The final CPU to be initialized would run the third instance of the emulator EMULATOR.EXE.

If the parameter CPUINSTANCE is equal to or greater than MAXCPUS, then control proceeds to step 504, where the parameter FRAMERUN is asserted high by the CPU running the third instance of the emulator EMULATOR.EXE to indicate to the Real Mode routine STARTUP that initialization has completed. From step 504, control proceeds to step 506, where the CPU is set idle. From step 506, control proceeds to step 518, where a halt command is asserted to the current CPU. The halted CPU remains idle until the host CPU 20 asserts an interprocessor interrupt to invoke the I/O emulation interrupt routine EMIOIPI.

If in step 502, the parameter CPUINSTANCE is less than MAXCPUS, control proceeds to step 508, where the environment on the current CPU running the emulator program is initialized.

Figures 7A, 7B:
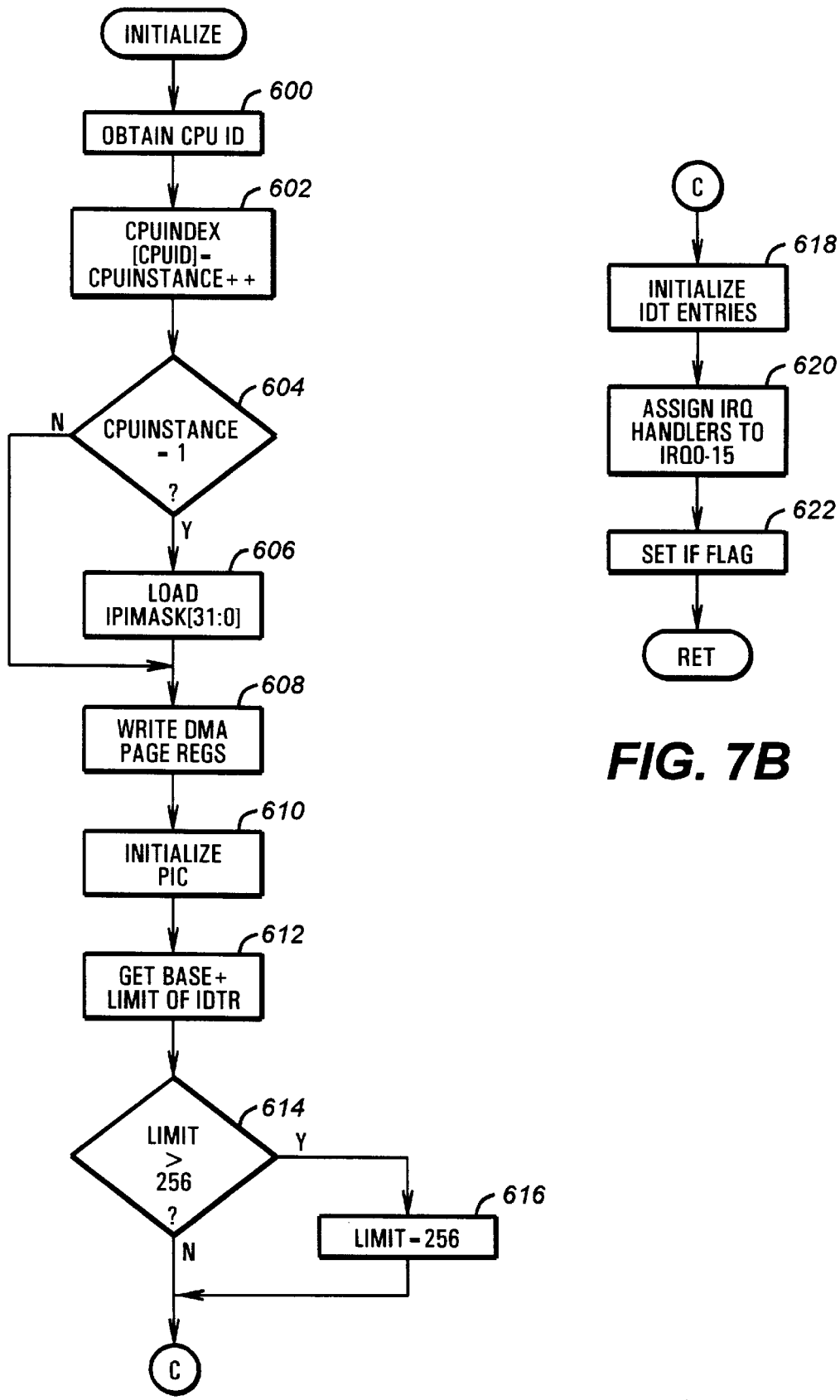
FIGS. 7A and 7B are a flow diagram of a subroutine called by the routine in FIG. 6 for performing certain initialization steps.

Referring now to FIGS. 7A and 7B, the flow diagram of the initialization routine is shown. In step 600, a read is performed to the current CPU to obtain its CPU ID. The CPU ID is stored in a variable CPUID. In the preferred embodiment, the CPU ID for logical CPU0 is 0×00, for logical CPU1 is 0×01, for logical CPU2 is 0×02, and for logical CPU3 is 0×03. In step 602, an index value CPUINDEX[CPUID] is assigned to the incremented value of the parameter CPUINSTANCE. In the IPI packet, the parameter CPUINSTANCE is preferably assigned the value zero. Therefore, the index CPUINDEX for the CPU running the first instance of the emulator EMULATOR.EXE is assigned the value 1. For the second instance, the index CPUINDEX is assigned the value 2. For the third instance, the assigned value for CPUINDEX is 3. Proceeding next to step 604, it is determined if the parameter CPUINSTANCE is equal to 1. The interprocessor interrupt (IPI) provided by the host CPU 20 is connected only to the CPU running the first instance of the emulator program. Thus, assuming that CPU 21 is the master CPU, its IPI mask register is set up. Thus, if the parameter CPUINSTANCE is equal to 1, control proceeds from step 604 to step 606. Otherwise, control proceeds to step 608. In step 606, the interprocessor interrupt mask parameter IPIMASK[31:0] in the IPI packet is initialized. Bits IPIMASK[31:24] are preferably assigned to the value 0×B to connect the master CPU 21 to the interrupt MPIRQ11. Thus, in the preferred embodiment, the master CPU 21 responds only to an interrupt at MPIRQ11. Bits IPIMASK[23:8] are reserved for future use and thus are assigned the value 0×0000. Bits IPIMASK[7:0] are assigned the value 0×02. Bits IPIMASK[7:0] are the mask bits for logical CPUs 7–0, respectively. Assigning the value 0×02 enables only logic CPU1, or physical CPU 21, to respond to the interprocessor interrupt on MPIRQ11. Proceeding next to step 608, the physical address EIOIPI of the IPI packet is written to the reserved DMA page registers. This must be done since the reserved DMA registers are cleared each time a new CPU is started. Proceeding next to step 610, the interrupt controllers INT-1 and INT-2 for the current CPU are initialized by loading the initialization command words ICW1, ICW2, ICW3 and ICW4. For a detailed description of the functions of the command words ICW1, ICW2, ICW3 and ICW4, refer to *Extended Industry Standard Architecture (EISA) Specification* 3.1, pp. 265–280, which is hereby incorporated by reference. Interrupt mask registers for the PIC in the CPU 21 are also initialized. The interrupt mask register of the interrupt controller INT-1 is initialized with the value 0×FB to enable only interrupt levels IRQ0 and IRQ1. The interrupt mask register of the interrupt controller INT-2 is initialized with the value 0×FF to mask out all the interrupts IRQ8–15. Proceeding next to step 612, the base address and size of the interrupt descriptor table IDT, contained in the register IDTR and initialized during the virtual environment setup of the current CPU in either step 220 or step 232 in FIG. 3B, are retrieved. In step 614, it is determined if the size of the interrupt descriptor table IDT is greater than 256. If not, control proceeds directly to step 618. If the size of the IDT is greater than 256, then control proceeds to step 616, where the size is set to the value 256. From step 616, control proceeds to step 618, where the contents of an interrupt dispatch table CPUnDISPATCH [255:0] are mapped to the 256 entries in the IDT. The variable n ranges from 0 to 3 in the preferred embodiment to correspond to logical CPUs 0–3. Each entry in the dispatch table CPUnDISPATCH[255:0] is initially assigned to the value of a vector pointing to a dummy routine EMINTSTUB. Proceeding next to step 620, vectors pointing to 16 IRQ handlers CPUnIRQ[15:0] are written to locations 0×30–0×45 in the IDT to replace the vector pointing to the dummy routine EMINTSTUB in those entries. Entries 0×30–0×45 of the IDT correspond to the 16 interrupt levels of the PIC. Thus, an interrupt asserted to the PIC would cause one of the IRQ handlers CPUnIRQ[15:0] to be invoked.

After the IDT has been properly initialized, control proceeds to step 622, where the IF flag in the microprocessor of the current CPU is set high to enable interrupts. From step 622, control returns to step 508 of FIG. 6.

Returning now to FIG. 6, after the emulator environment has been initialized in the current CPU, control proceeds to step 510, where it is determined if the parameter CPUINSTANCE is equal to 1. If not, control proceeds directly to step 516. If the current CPU is the master CPU, then control proceeds to step 512, where the IPI processor port of the master CPU 21 is enabled to accept interrupts from the host CPU 20. Proceeding next to step 514, the I/O emulation interrupt handler EMIOIPI is connected to a predetermined interrupt level by a subroutine INTCONN. In the preferred embodiment, the I/O emulation interrupt handler EMIOIPI is connected to interrupt level MPIRQ11. The subroutine INTCONN is described in greater detail below in FIG. 8. Although the preferred embodiment shows only an emulation interrupt handler being connected to a particular interrupt level in the master CPU 21, other interrupt handlers can be readily connected to any of the interrupt levels in the other CPUs 22 and 23 if desired by the user. This would be desirable in the situation where the emulation of a peripheral device can be separated out into multiple tasks that can be run concurrently. Proceeding next to step 516, the parameter FRAMERUN is asserted high to notify the host CPU 20 that the current CPU has been properly set up. Proceeding next to step 518, a halt command is asserted to the current CPU. The CPU remains idle until the host CPU 20 asserts an interprocessor interrupt.

It is also contemplated that in an alternative embodiment, communication between the host CPU 20 and the other CPUs, including the master CPU21, can be accomplished by use of packets in the memory 32. This would form alternative communication channels between the host CPU 20 and the other CPUs 21, 22 and 23. The desired CPUs 21, 22 and 23 would be continuously polling the memory locations storing the packets to determine if they should be activated.

Figure 8:
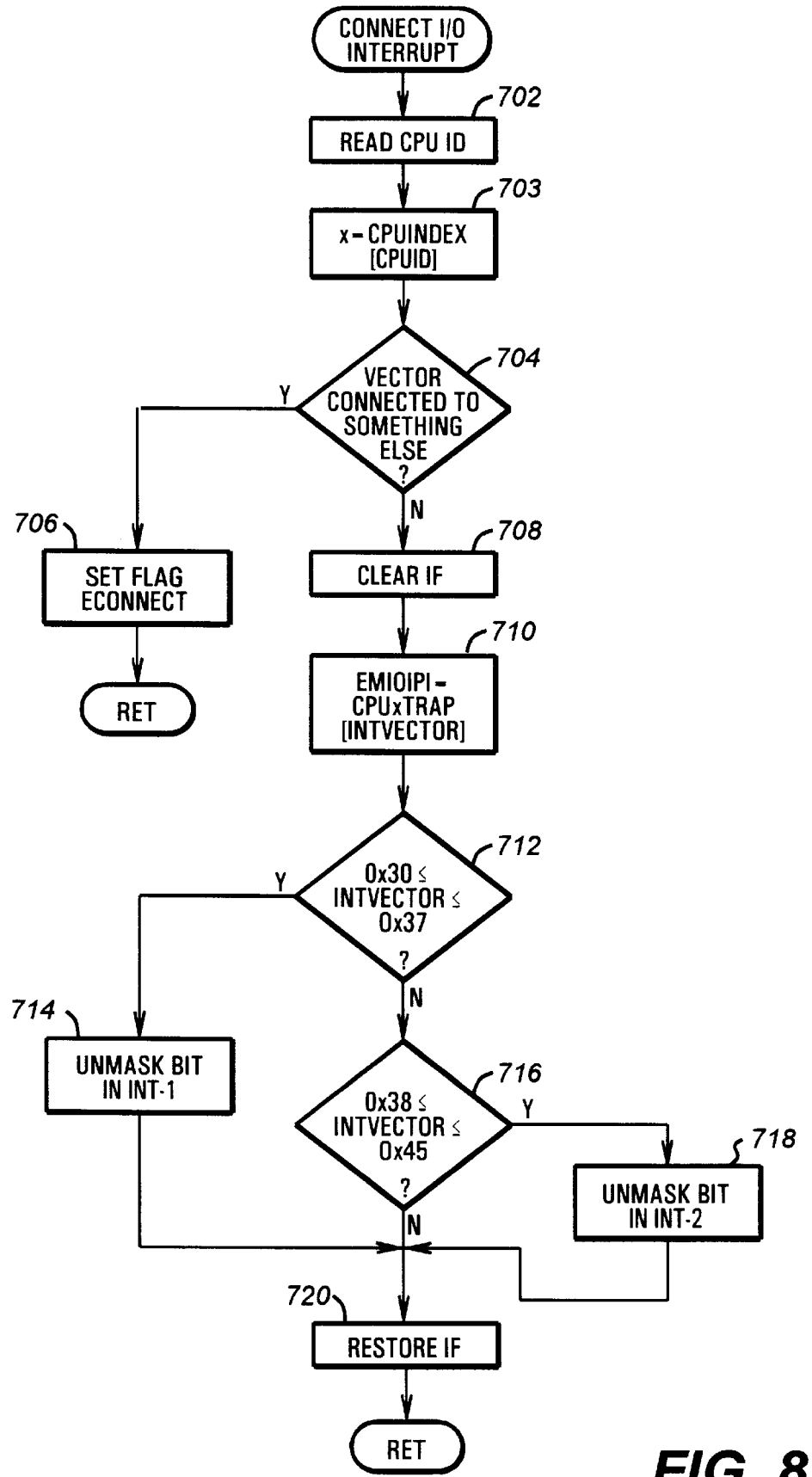
FIG. 8 is a flow diagram of a subroutine called by the routine of FIG. 6 that connects an I/O emulation interrupt handler to a particular interrupt level of the programmable interrupt controller in the central processing unit of FIG. 2.

Referring now to FIG. 8, a flow diagram of the subroutine INTCONN is shown. As will be described below, this subroutine allows the emulator to connect an interrupt service routine without the host CPU 20 needing to know about the configuration of the INT-1 and INT-2 interrupt controllers of any of the CPUs 21–23. The arguments passed to the subroutine INTCONN from step 514 of FIG. 6 are the pointer to the interrupt service routine EMIOIPI and the vector INTVECTOR into the IDT that would cause the routine EMIOIPI to be invoked. Beginning in step 702, the CPU ID is read and stored in a variable CPUID. Each of the possible logical CPUs 0–3 are assigned an interrupt descriptor table IDT. As discussed in FIG. 7B, entries 0×30 to 0×45 of the IDT are assigned to IRQ handlers CPUnIRQ[0:15], respectively. Thus, if the first instance of the emulator program is run on logical CPU1, and the host CPU 20 asserts an interprocessor interrupt via MPIRQ11, the IRQ handler CPU1IRQ11 is invoked. The IRQ handler CPU1IRQ11 preferably calls the dispatch table entry CPU1DISPATCH [INTVECTOR], which will later be connected to the I/O emulation interrupt handler EMIOIPI. After the interrupt handler EMIOIPI has completed execution, the remaining instructions of the handler CPU1IRQ11 send an EOI sequence to the PIC for interrupt level IRQ11. Consequently, the I/O emulation interrupt routine EMIOIPI need not know anything about the PIC of CPU 21 to service the interrupt asserted on MPIRQ11.

In step 703, the value of x is set equal to CPUINDEX [CPUID]. As discussed above, CPUINDEX[CPUID] denotes the instance of the emulator running on the CPU having an ID equal to CPUID. Next, in step 704, it is determined if the vector INTVECTOR is already connected to another interrupt service routine. In step 704, it is determined if the dispatch table entry CPU1DISPATCH [INTVECTOR] is equal to the dummy routine EMINTSTUB. If the dispatch table entry CPU1DISPATCH [INTVECTOR] is not equal to EMINTSTUB, then that indicates that the entry corresponding to the vector INTVECTOR has already been assigned to another interrupt service routine by the subroutine INTCONN. In that case, control proceeds to step 706, where an error flag ECONNECT is set to notify the host CPU 20 that the I/O emulation interrupt routine EMIOIPI cannot be connected to the desired entry.

If the interrupt vector INTVECTOR is not connected to something else, then control proceeds to step 708, where the IF flag in the flags register EFLAGS of the microprocessor 72 is cleared to disable further interrupts from the PIC. This ensures that the microprocessor in CPU 21 does not respond to a maskable interrupt while it is modifying the interrupt dispatch table CPU1DISPATCH. Proceeding next to step 710, the vector pointing to the I/O emulation interrupt handler EMIOIPI is written to the dispatch table entry CPU1DISPATCH[INTVECTOR]. Thus, when the host CPU 20 invokes an IPI interrupt MPIRQ11 and provides INTVECTOR, the I/O emulation interrupt handler EMIOIPI is called.

From step 710, control proceeds to step 712, where it is determined if the interrupt vector INTVECTOR contains a value between 0×30 and 0×37. The specified range of values correspond to MPIRQ[0:7], respectively, and are mapped to the interrupt controller INT-1. If it is determined that the interrupt vector INTVECTOR is mapped to interrupt controller INT-1, then control proceeds to step 714, where the appropriate mask bit is cleared in the interrupt controller INT-1 to enable the hardware interrupt. If the interrupt vector INTVECTOR is not between the values 0×30 and 0×37, control proceeds to step 716, where it is determined if INTVECTOR is between the values 0×38 and 0×45. In the preferred embodiment, these correspond to the vectors mapped to the interrupt controller INT-2. If it is determined that the interrupt vector INTVECTOR is mapped to the interrupt controller INT-2, then control proceeds to step 718, where the appropriate mask bit in the interrupt controller INT-2 is cleared. Since INTVECTOR corresponds to interrupt level MPIRQ11, the mask bit associated with IRQ11 in the INT-2 interrupt controller is cleared in the preferred embodiment. Control then proceeds to step 718, where the original interrupt flag IF is restored. From either step 714 or 718, control proceeds to step 720. From step 720, control returns to step 514 in FIG. 6, where control.

As noted above, device drivers in the preferred embodiment are written as "C" routines. Thus an I/O command to a peripheral device is accomplished by means of macro commands, also written as "C" routines. The macro commands are preferably stored on the hard disk drive 71, although the macro commands may be stored in any available secondary storage device, and compiled by the compiler or assembler for use by the device drivers to perform I/o accesses to peripheral devices. As explained above, a first set of macro commands exists which is compiled by the compiler or assembler if the parameter EIO_EMULATOR is set low at compile time, indicating emulation mode is not selected. The first set of macro commands perform actual I/O commands to the peripheral devices. A second set of macro commands is compiled by the compiler or assembler if the parameter EIO_EMULATOR is set high at compile time, indicating emulation mode. In that case, the compile macro commands issue interprocessor communication sequences via an IPI to the master CPU 21 to perform I/O emulation of peripheral devices. In response to the interprocessor communications sequences, the master CPU 21 invokes the I/O emulation interrupt handler EMIOIPI to perform the emulation.

Examples of commands asserted by a device driver include the macros EIOIREADUCHAR, EIOIREADUSHORT, EIOIREADULONG, EIOIWRITEUCHAR, EIOIWRITEUSHORT, EIOIWRITEULONG, EIOMREADUCHAR, EIOMREADUSHORT, EIOMREADULONG, EIOMWRITEUCHAR, EIOMWRITEUSHORT, and EIOMWRITEULONG. The macros EIOIREADUCHARD, EIOIREADUSHORT, and EIOIREADULONG read an 8-bit value, a 16-bit value, and a 32-bit value, respectively, from an I/O-mapped I/O address. The macros EIOIWRITEUCHAR, EIOIWRITEUSHORT, and EIOI-WRITEULONG write an 8-bit value, a 16-bit value, and a 32-bit value, respectively, to an I/O-mapped I/O address. The macros EIOMREADUCHAR, EIOMREADUSHORT, and EIOMREADULONG read an 8-bit value, a 16-bit value, and a 32-bit value, respectively, from a memory-mapped I/O address. The macros EIOMWRITEUCHAR, EIOMWRITEUSHORT, and EIOMWRITEULONG write an 8-bit value, a 16-bit value, and a 32-bit value, respectively, to a memory-mapped I/O address. For the sake of brevity, the above macros are presented as examples of certain of the I/O commands that are performed, it being understood that other macros are available for performing other I/O commands.

Figure 9:
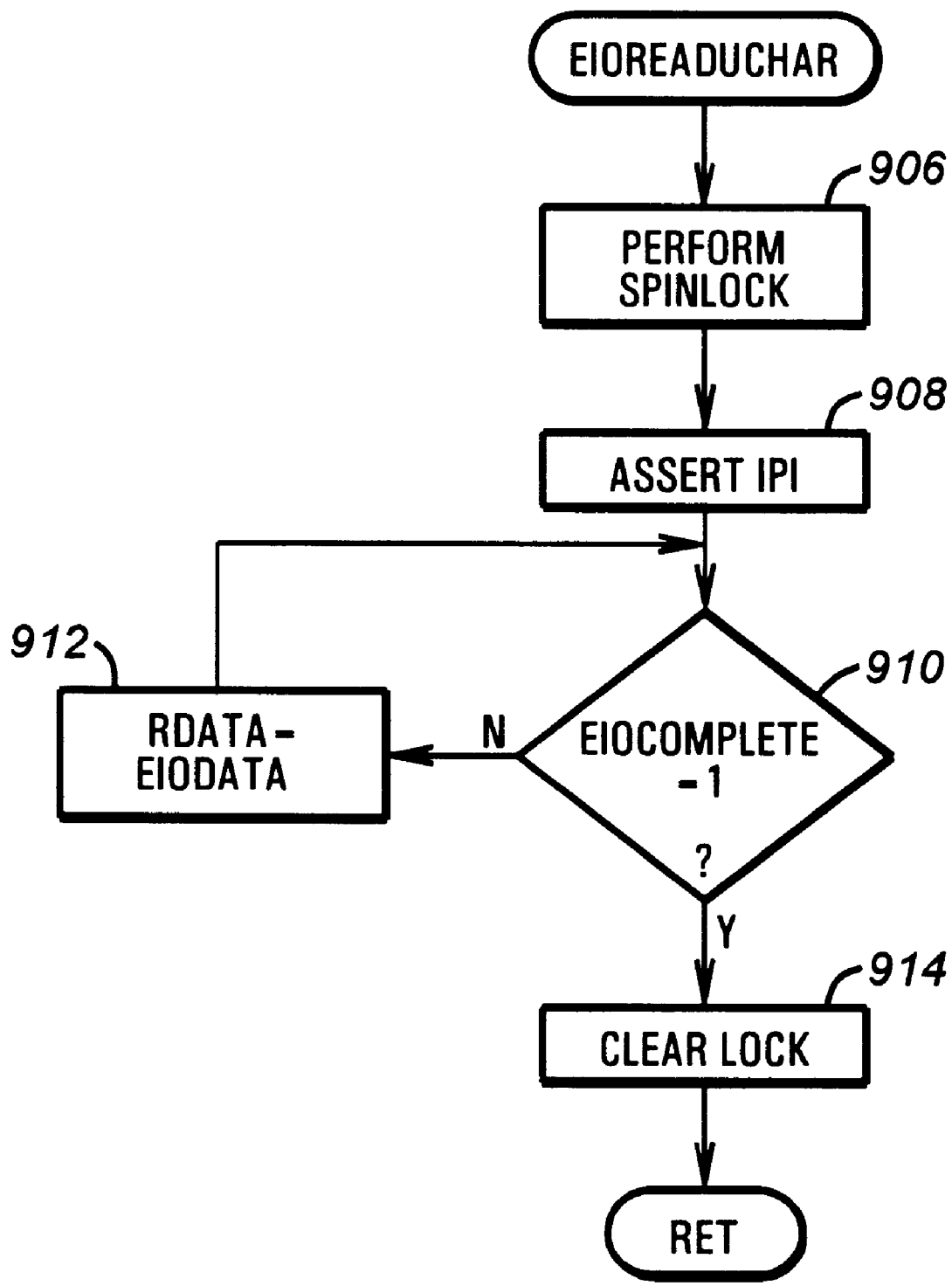
FIG. 9 is a flow diagram of an exemplary I/O command macro.

Referring now to FIG. 9, a flow diagram is shown of the steps involved in performing an exemplary macro command EIOIREADUCHAR in the second set of macro commands. The second set is utilized by the compiler or assembler when the parameter EIO_EMULATOR is set high. The argument passed is an I/O address RIOADR, with the read data being placed in RDATA. Proceeding to step 906, where a macro SPINLOCK is invoked to serialize requests to the emulator EMULATOR.EXE. In a multi-tasking, multi-processing environment such as the computer C, later requested tasks, in this case I/O commands that would access the PIC in the master CPU 21, must be locked from the same resources in the targeted CPU to ensure proper completion of the first operation. The SPINLOCK macro serializes multiple requests submitted to the emulator from multiple host CPUs by acquiring exclusive access to a semaphor field embedded in the IPI emulator packet. Other CPUs trying to acquire the semaphor already owned by another CPU will spin within their respective caches until the CPU that owns the semaphor releases it. A CPU requesting exclusive access to the semaphor does this by asserting the CPU LOCK signal in order to perform an atomic read-modify-write operation to the semaphor memory location.

From step 906, control proceeds to step 908, where an interprocessor interrupt is asserted to the IPI port of the master CPU 21. The interrupt MPIRQ11 is asserted by writing the parameter IPIMASK[31:0] into the programmable interrupt port of the CPUs 21–23 and by enabling MPIRQ11 by writing the appropriate value into the interrupt control port. As noted above, bits IPIMASK[7:0] contain the value 0x02 to indicate that CPU 21 is to respond to the current IPI. Bits IPIMASK[31:24] contain the value 0x0B to indicate that the current IPI level is MPIRQ11. As noted earlier, the interrupt signal MPIRQ11 is ORed with the interrupt level IRQ11 asserted by the MUX bus controller 92 and provided to the IRQ11 input of the PIC located in the DSP 88A. In response, an interrupt signal INT is asserted to the microprocessor 72. Next, the I/O emulation interrupt routine EMIOIPI is invoked. Proceeding next to step 910, it is determined if the parameter EIOCOMPLETE is asserted high by the interrupt handler EMIOIPI in step 806, which would indicate that the emulation operation has completed. If the parameter EIOCOMPLETE contains the value 0, then control proceeds to step 912, where the contents of the parameter EIODATA are placed into RDATA. From step 912, control proceeds back to step 910. Once the parameter EIOCOMPLETE is set high, control proceeds to step 914, where the semaphor is cleared to allow pending requests to the emulator EMULATOR.EXE to be communicated to the master CPU 21. From step 914, control returns to the device driver program calling the macro EIOIREADUCHAR.

Figure 10:
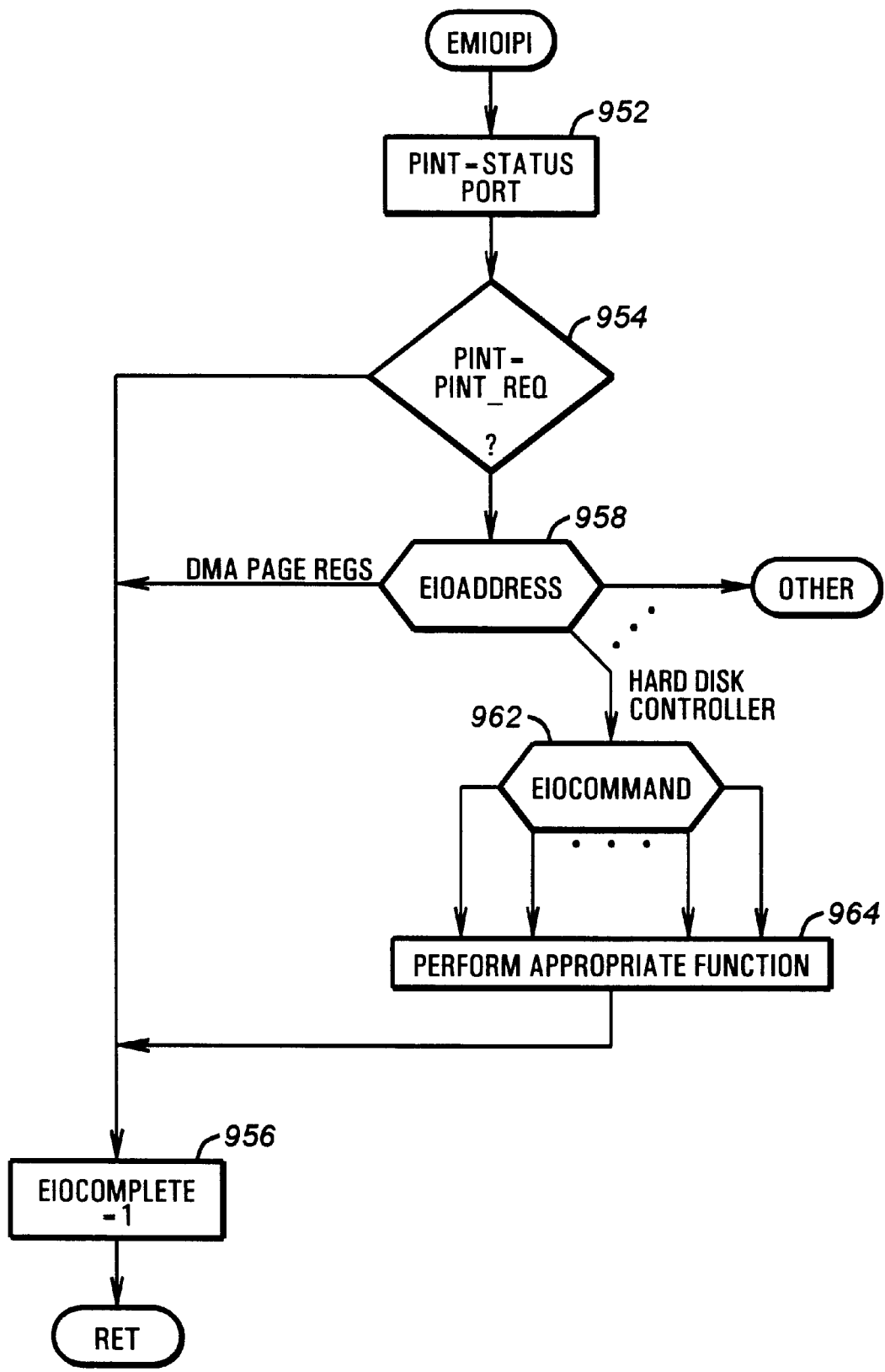
FIG. 10 is a flow diagram of the I/O emulation interrupt handler.

Referring now to FIG. 10, the I/O emulation interrupt routine EMIOIPI is shown. Beginning in step 952, the IPI status port of the master CPU 21 is read, with the results placed into a variable PINT. Next in step 954, it is determined if the variable PINT contains a value indicating that an interprocessor interrupt has been requested. If not, control proceeds to step 956, where a parameter EIOCOMPLETE is set to the value 1 to indicate that the I/O emulation has completed. The parameter EIOCOMPLETE is also included in the IPI packet. If an interprocessor interrupt is requested, then control proceeds from step 954 to step 958, where the address EIOADDRESS contained in the IPI packet is retrieved. If the address EIOADDRESS is equal to the I/O address of the reserved DMA page registers, then control proceeds to step 956, where the parameter EIOCOMPLETE is asserted to indicate that the emulation operation has completed. Since the reserved DMA page registers contain the physical address of the IPI packet, it must be ensured that the DMA page registers are not overwritten.

By adding branches from step 808, a plurality of I/O ports corresponding to different peripheral devices can be emulated. Thus, for example, if the address EIOADDRESS is equal to the I/O address of a particular port in a hard disk controller being emulated, then control proceeds to step 962, where the value of the parameter EIOCOMMAND in the IPI packet is determined. The parameter EIOCOMMAND determines the type of command that is requested by the device driver. Proceeding next to step 964, depending upon the command requested, the appropriate values are returned. For a read operation to an I/O port, the function performed in step 964 is to provide the expected data to the parameter EIODATA in the IPI packet. For a write operation, the data provided by the device driver is placed into the parameter EIODATA. From step 964, control proceeds to step 956, where the parameter EIOCOMPLETE written with the value 1 to indicate that the emulation program has completed. From step 956, control exits from the interrupt handler EMIOIPI.

The foregoing has described a method and apparatus for emulating a peripheral device in a multiprocessor computer system to test device driver programs. The emulation program is loaded by a host microprocessor into one or more of the other microprocessors (target microprocessors) which are not being accessed by the operating system software. After the emulation program is loaded, control vectors to the entry point of the emulation program, where the environment in each of the target microprocessors are initialized for the emulator program. If more than one target microprocessor are utilized, then one of the target microprocessors are designated as the "master" microprocessor, which accepts interprocessor interrupts from the host microprocessor. When the device driver program running on the host microprocessor invokes an I/O command, and emulation mode is selected, then an interprocessor interrupt (IPI) is asserted to the master microprocessor. In response, an I/O emulation interrupt handler is executed by the master microprocessor to provide the appropriate responses to the device driver under test.

Numerous benefits result from having the emulation of the peripheral device executing on a separate or multiple separate processors from the host processor executing the device driver. First, program and task continuity are better maintained on the host processor, as large amounts of time are not spent running emulation code. The effective task flow on the host processor is very close to that which will occur in the final system. The task flow change between the IPI communication and the actual I/O or memory operations is very minor when compared to the change required to run the emulator. Thus the basic operation of the host computer is much closer to final, allowing more complete development of the device driver, particularly the interaction with other tasks. Second, as the separate processor is by definition a bus master, and most advanced peripheral device controllers are bus masters, the interaction between the host processor and the peripheral device bus master is also better emulated. It is easier to determine and develop the interface and communication than if the emulator code is running on the host processor. Thus improved bus master emulation is also provided, which also improves the time of device driver development. The use of the separate processor or processors better emulates the operation of a peripheral device under development than if the emulation code were run on the host processor. This allows more complete device driver development prior to availability of the actual peripheral device, which in turn allows the peripheral device to be released sooner than otherwise reasonably possible, allowing a further increase in the hectic pace of technology improvement.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

I claim:

1. A system for emulating a peripheral device, comprising:
   a host bus;
   a memory coupled to said host bus containing a device driver and a peripheral device emulation program;
   a first general purpose processor coupled to said host bus and executing said device driver; and
   a second general purpose processor coupled to said host bus and having a communication channel accessible by said first general purpose processor, said second general purpose processor executing said peripheral device emulation program, said first general purpose processor accessing said communication channel when said device driver performs an I/O access to the peripheral device being emulated to provide an I/O address and an I/O command, wherein said peripheral device emulation program responds to said I/O address and I/O command to emulate the peripheral device response,
   wherein said memory further contains a communications packet having a plurality of parameters, and wherein communication between said device driver and said peripheral device emulation program is accomplished via said communications packet.

2. A system for emulating a peripheral device, comprising:
   a host bus;
   a memory coupled to said host bus containing a device driver and a peripheral device emulation program;
   a first general purpose processor coupled to said host bus and executing said device driver;
   a second general purpose processor coupled to said host bus and having a communication channel accessible by said first general purpose processor, said second general purpose processor executing said peripheral device emulation program, said first general purpose processor accessing said communication channel when said device driver performs an I/O access to the peripheral device being emulated to provide an I/O address and an I/O command, wherein said peripheral device emulation program responds to said I/O address and I/O command to emulate the peripheral device response; and
   an actual peripheral device coupled to said host bus, wherein an I/O access by said device driver to said actual peripheral device causes said first general purpose processor to access said actual peripheral device rather than said communications channel of said second general purpose processor.

3. A system for emulating a peripheral device comprising:
   a host bus:
   a memory coupled to said host bus containing a device driver and a peripheral device emulation program;
   a first general purpose processor coupled to said host bus and executing said device driver; and
   a second general purpose processor coupled to said host bus and having a communication channel accessible by said first general purpose processor, said second general purpose processor executing said peripheral device emulation program, said first general purpose processor accessing said communication channel when said device driver performs an I/O access to the peripheral device being emulated to provide an I/O address and an I/O command, wherein said peripheral device emulation program responds to said I/O address and I/O command to emulate the peripheral device response, wherein said communication channel of said second general purpose processor includes an interprocessor interrupt port, and wherein said first general purpose processor asserts an interprocessor interrupt to said interprocessor interrupt port when said device driver performs said I/O access to the peripheral device being emulated.

4. The system of claim 3, wherein said memory further contains an interprocessor interrupt packet having a plurality of parameters, wherein communication between said device driver code and said peripheral device emulation program is accomplished via said interprocessor interrupt packet.

5. The system of claim 3, wherein said peripheral device emulation program includes an emulation interrupt handler, said emulation interrupt handler being invoked when said interprocessor interrupt is asserted by said first general purpose processor.

6. A system for emulating a peripheral device, comprising:

a host bus;

a memory coupled to said host bus containing a device driver and a peripheral device emulation program;

a first general purpose processor coupled to said host bus and executing said device driver a second general purpose processor coupled to said host bus and having a communication channel accessible by said first general purpose processor, said second general purpose processor executing said peripheral device emulation program, said first general purpose processor accessing said communication channel when said device driver performs an I/O access to the peripheral device being emulated to provide an I/O address and an I/O command, wherein said peripheral device emulation program responds to said I/O address and I/O command to emulate the peripheral device response; and a third general purpose processor coupled to said host bus, wherein said memory further contains a second peripheral device emulation program, wherein said third general purpose processor executes said second peripheral device emulation program for concurrent emulation of a peripheral device on said second and third general purpose processors.

7. A method of emulating a peripheral device in a multiprocessor computer system, wherein the multiprocessor computer system includes a first general purpose processor, a second general purpose processor, and a memory, all coupled to a host bus, the memory containing a device driver, and a communications packet having a plurality of parameters the first general purpose processor for executing said device driver, the second general purpose processor having a communications channel accessible by the first general purpose processor, the method comprising the steps of:

loading a peripheral device emulation program into the memory;

performing an I/O access to the peripheral device to be emulated to provide an I/O address and an I/O command by the device driver;

accessing the communication channel of the second general purpose processor in response to the device driver performing said I/O access by the first general purpose processor; and responding to said access of the communication channel by invoking said peripheral device emulation program by the second general purpose processor, wherein said peripheral device emulation program responds to said I/O address and I/O command to emulate the peripheral device response; and writing certain of said plurality of parameters in said communications packet to communicate to said peripheral device emulation program by the device driver code; and writing certain others of said plurality of parameters in said communications packet to communicate to the device driver code by said peripheral device emulation program.

8. A method of emulating a peripheral device in a multiprocessor computer system, wherein the multiprocessor computer system includes a first general purpose processor, a second general purpose processor, and a memory, all coupled to a host bus, the memory containing a device driver, the first general purpose processor for executing said device driver, the second general purpose processor having a communications channel accessible by the first general purpose processor, the method comprising the steps of:

loading a peripheral device emulation program into the memory;

performing an I/O access to the peripheral device to be emulated to provide an I/O address and an I/O command by the device driver;

accessing the communication channel of the second general purpose processor in response to the device driver performing said I/O access by the first general purpose processor; and responding to said access of the communication channel by invoking said peripheral device emulation program by the second general purpose processor, wherein said peripheral device emulation program responds to said I/O address and I/O command to emulate the peripheral device response, wherein the memory further contains an operating system, wherein the first general purpose processor is controlled by said operating system, and wherein said peripheral device emulation program executed by the second general purpose processor is independent of said operating system.

9. A method of emulating a peripheral device in a multiprocessor computer system, wherein the multiprocessor computer system includes a first general purpose processor, a second general purpose processor, and a memory, all coupled to a host bus, the memory containing a device driver, the first general purpose processor for executing said device driver, the second general purpose processor having a communications channel accessible by the first general purpose processor, the method comprising the steps of:

loading a peripheral device emulation program into the memory;

performing an I/O access to the peripheral device to be emulated to provide an I/O address and an I/O command by the device driver;

accessing the communication channel of the second general purpose processor in response to the device driver performing said I/O access by the first general purpose processor;

responding to said access of the communication channel by invoking said peripheral device emulation program by the second general purpose processor, wherein said peripheral device emulation program responds to said I/O address and I/O command to emulate the peripheral device response; and wherein the communication channel of the second general purpose processor includes an interprocessor interrupt port, and wherein said step of the first general purpose processor accessing the communication channel includes the step of:

the first general purpose processor asserting an interprocessor interrupt to said interprocessor interrupt port when the device driver code performs the I/O access to the peripheral device being emulated.

* * * * *